Figure 1:
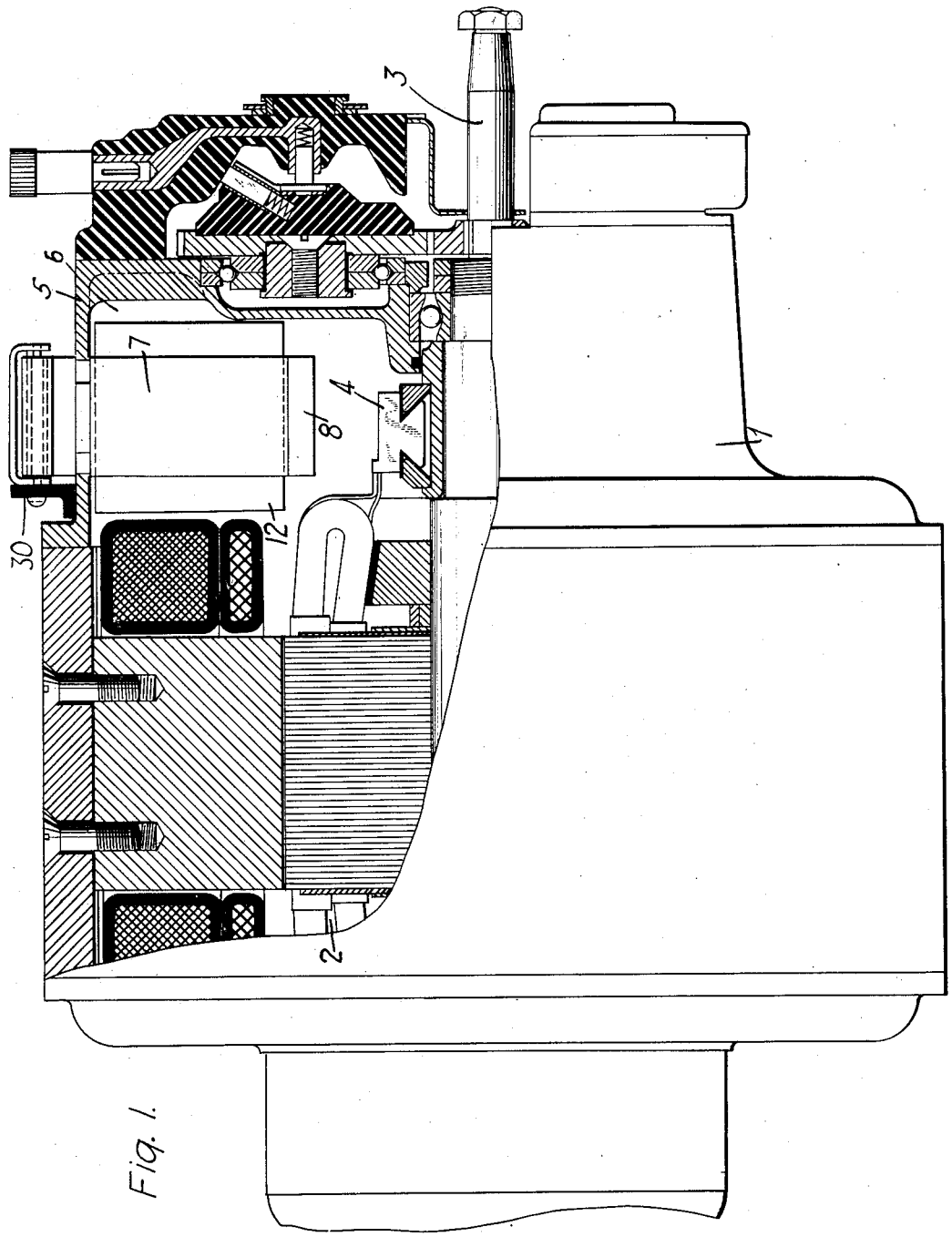

F. CONRAD.
REGULATOR AND CUT-OUT.
APPLICATION FILED APR. 2, 1913.

1,260,647.

Patented Mar. 26, 1918.
2 SHEETS—SHEET 1.

F. CONRAD.
REGULATOR AND CUT-OUT.
APPLICATION FILED APR. 2, 1913.
1,260,647.
Patented Mar. 26, 1918.
2 SHEETS—SHEET 2.
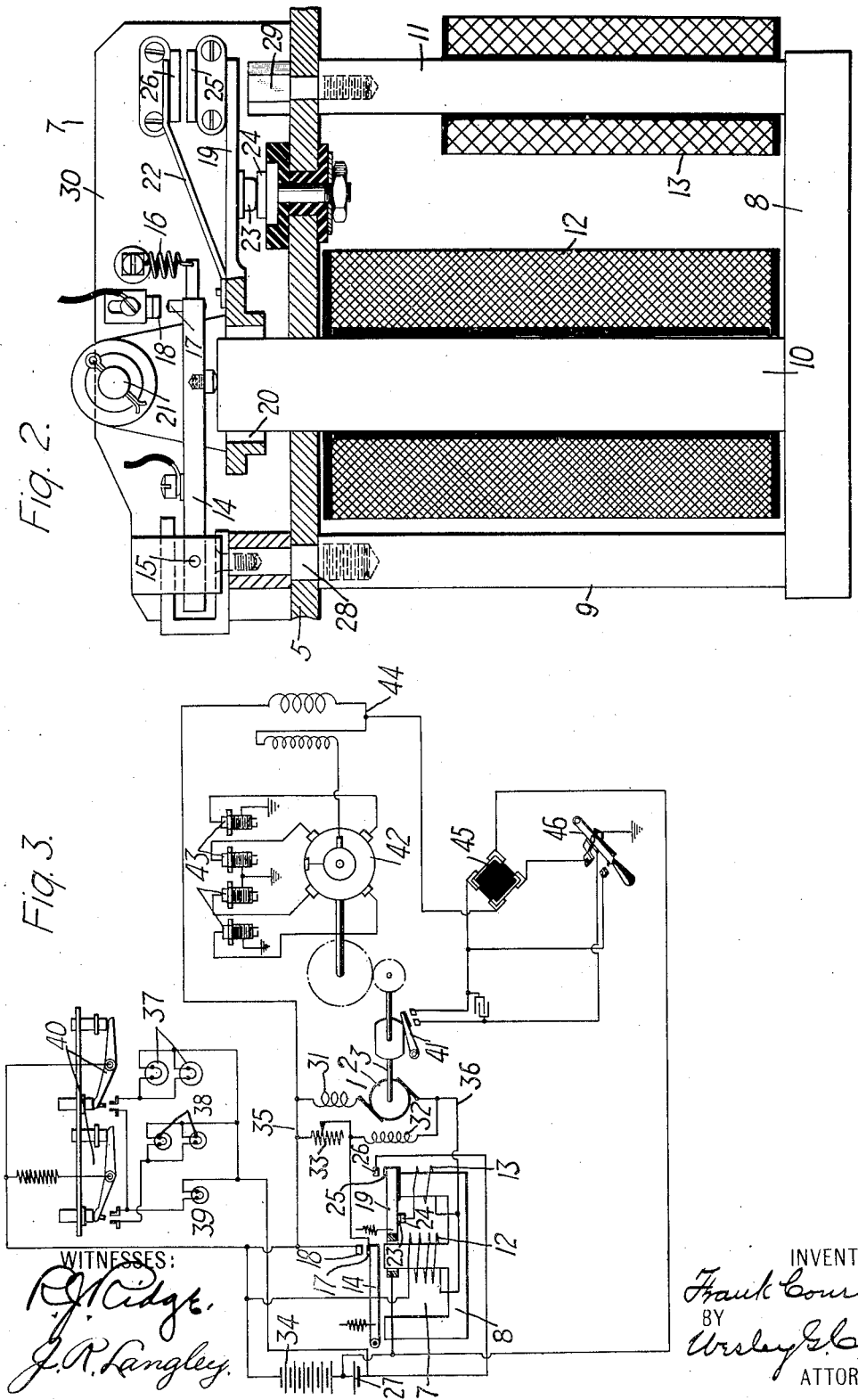
WITNESSES:
INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

REGULATOR AND CUT-OUT.

1,260,647.  Specification of Letters Patent.  Patented Mar. 26, 1918.

Application filed April 2, 1913. Serial No. 758,310.

*To all whom it may concern:*

Be it known that I, FRANK CONRAD, a citizen of the United States, and a resident of Swissvale, in the county of Allegheny and State of Pennsylvania, have invented a new and useful Improvement in Regulators and Cut-Outs, of which the following is a specification.

My invention relates to regulators and cutouts and it has special reference to such mechanism as may be employed in connection with the electrical systems of automobiles or other motor vehicles to regulate the voltage and to control the circuit connections of such systems.

My invention has for one of its objects to provide a regulator and cutout of the above indicated character which operate independently to perform their respective functions and are combined to form a unitary structure.

A further object of my invention is to provide a structure in which the combined regulator and cutout may be mounted inside the casing of a generator to form a part of the generator structure.

In the use of generators that are operatively connected to the engines of motor-driven vehicles, it is necessary to provide suitable controlling and regulating means in connection therewith because of the various speeds at which such vehicles are operated. An excessive generator voltage may cause damage to the storage battery or burn out the lamps of the vehicle. The circuit connections between the generator and the storage battery must be controlled in order to prevent the battery from discharging back through the generator when the voltage of the former exceeds that of the latter.

My invention provides a combined regulator and cutout which operate independently to automatically perform their respective functions and have certain structural elements in common to form an integral structure. My invention further provides a structure for mounting the regulator and cutout within the generator casing where it may be protected and will form a part of the generator structure. The connections between the generator windings and the regulator and cutout may be made before leaving the factory, so that only the usual external connections are necessary in assembling the system.

My invention is described in detail in connection with the accompanying drawings in which Figure 1 is a side view, partially in elevation and partially in section, of an electric generator with my invention applied thereto. Fig. 2 is a view, partially in elevation and partially in section, of a combined regulator and cutout. Fig. 3 is a diagrammatic view of circuits and apparatus embodying my invention.

Referring particularly to Fig. 1, the generator 1 comprises an armature 2, an armature shaft 3, a commutator 4 and an end casing 5 of a non-magnetic metal or alloy. The casing 5 is provided with a chamber 6 immediately above the commutator 4, in which is located a combined regulator and cutout 7.

The details of the regulator and cutout mechanism are illustrated in Fig. 2. An electromagnet of approximately E-shape comprises a base member 8 and three posts or leg members 9, 10 and 11, all of which are of magnetic material. The member 10 constitutes the core member for a coil 12 which is connected in shunt relation to the generator armature. A coil 13, which surrounds the member 11, is connected in series with the generator armature.

An armature 14, which bridges the free ends of the members 9 and 10, has a pivotal support at 15 and is normally retained in its uppermost position by a spring 16. A contact member 17 is mounted upon and connected to the armature 14 and, in the upper position of the armature, engages a stationary contact member 18. An armature 19 is provided with a circular opening 20 that is of larger diameter than the member 10 and surrounds the upper end of the latter from which it is separated by an air gap. The armature 19, which bridges the spaces between the free ends of the members 10 and 11, has a pivotal support 21 and is normally held upward by a spring 22. A contact member 23 is mounted upon and connected to the armature 19 and, in the lower position of the latter, engages a contact member 24 that is connected to the series coil 13.

A contact member 25 is mounted upon the upper side of the armature 19 and, in the upper position of the latter, engages a contact member 26 that is electrically connected to one terminal of a cell 27 (Fig. 3). The members 9 and 11 are attached to the casing 5 by bolts 28 and 29 which form extensions or pole pieces for the respective members. The stationary contact members 18 and 26 are mounted upon an insulating block 30 and the contact member 24 is mounted upon and insulated from the end casing 5. A removable cover (not shown) may be employed to protect the contact members and render them accessible for inspection and adjustment.

Referring to Fig. 3, the generator 1 is provided with a series field winding 31, a shunt field winding 32 and a variable resistor 33 that is in series with the winding 32. A storage battery 34 is connected directly to the line conductor 35 of the generator and is connected to the line conductor 36 through connections that are controlled as hereinafter described. The cell 27 is commonly known as an unformed lead cell and is connected to the battery 34 with its electromotive force opposing that of the battery. Current is supplied by the battery 34 or the generator 1, according to circuit conditions, to a lighting system and an ignition system.

The lighting system comprises the head lights 37, side lights 38 and the tail light 39 of an automobile, the several lamp circuits being controlled by switches 40. The ignition circuit comprises an interrupter 41 that is mounted on the armature shaft 3, a distributer 42, spark plug 43, an induction coil 44, a plug switch 45 and a starting switch 46. The details of the lighting and ignition systems form the subject-matter of separate applications and complete description thereof is therefore omitted as being unnecessary to an understanding of my present invention.

In the normal positions of the various parts, the armatures 14 and 19 are held upward by their respective springs 16 and 22 and the generator circuit is broken at the contact members 23 and 24. The cell 27 is shunted by a circuit extending from one terminal of the cell through the armature 19 and contact members 25 and 26 to the other terminal of the cell. Assuming that the engine (not shown) of the automobile has been started by any suitable means, the generator 1 is driven at an increasing speed. As the voltage increases, the coil 12 energizes a magnetic circuit comprising the member 10 the air gap between the member 10 and the armature 19, the member 11 and the base member 8. When a predetermined voltage is reached, the armature 19 is drawn downwardly to separate the contact members 25 and 26 and to connect the contact members 23 and 24.

The separation of the first pair of contact members breaks the short circuit around the cell 27 and inserts the cell in series with the lighting system. The engagement of the second pair of contact members connects the line conductor 36 to the battery through the series coil 13, to contact members 23 and 24 and the armature 19, the generator circuit being completed through the battery 34, the line conductor 35 and the series field winding 31. The series coil 13 acts as a holding coil to retain the armature 19 in its lower position during the charging operation. It will be noted that, while the battery receives the full voltage of the generator, the lamps are subjected only to the voltage of the generator minus the voltage of the cell 27 which opposes that of the generator.

The coil 12 energizes the magnetic circuit comprising the members 10, 8 and 9 and the armature 14 during the operation of the generator. The coil 12 is in shunt relation to the generator and is energized in proportion to the generator voltage. When the voltage of the generator exceeds a predetermined value, the armature 14 is drawn downwardly to separate the contact members 17 and 18 and open a short circuit around the resistor 33 to place the latter in series with the shunt field winding 32. The generator field is weakened thereby and, when the generator voltage falls to a predetermined value, the armature 14 is released to again short circuit the resistor 33. The regulator is similar in appearance and operation to the well known Tirrill regulator in which an oscillating contact member intermittently short circuits a resistor, the number of oscillations varying with the voltage.

Upon a decrease in generator voltage to a value that is lower than that of the battery, current will flow in the reverse direction in the charging circuit which includes the series coil 13. The magnetic field of the coil 13, which normally assists that of the coil 12, then opposes the latter and, as a result, the armature 19 is released and is returned to its upper position by the spring 22. The contact members 23 and 24 are separated by the movement of the armature 19 to break the charging circuit, and the contact members 25 and 26 are connected to short circuit the cell 27. The lighting and ignition systems are supplied with current from the generator during the charging operation but from the battery at other times.

It will be understood that the system employed in connection with the regulator and cutout is illustrative only and is not to be considered a limitation. It is obvious that many changes in my invention will occur to one skilled in the art and that such changes may be made without departing from the spirit of my invention as fall within the scope of the appended claims.

I claim as my invention:

1. The combination with an electric generator, and a main circuit therefor, of a unitary mechanism for controlling the voltage of said generator and for controlling said circuit, said means comprising a core member having a plurality of parts to constitute a plurality of magnetic circuits, one of said parts being common to said magnetic circuits, an armature member in each of said magnetic circuits, a coil surrounding said one part for energizing said magnetic circuits and a coil on another of said parts for energizing one of said magnetic circuits.

2. The combination with an electric generator, and a main circuit therefor, of a unitary mechanism for controlling the voltage of said generator and for controlling said main circuit, said mechanism comprising an electromagnet having a plurality of magnetic circuits, a member common to said magnetic circuits, a member in one only of said magnetic circuits, and coils surrounding said members for energizing said magnetic circuits.

3. The combination with an electric generator, and a main circuit therefor, of a unitary mechanism for controlling the voltage of said generator and for controlling said main circuit, said mechanism comprising an electromagnet having a plurality of magnetic circuits, a member common to a plurality of said magnetic circuits, a coil in shunt relation to said generator surrounding said member, and a coil in series relation to said generator for energizing one of said magnetic circuits.

4. The combination with an electric generator, and a main circuit therefor, of a unitary mechanism for controlling the voltage of said generator and for controlling said main circuit, said mechanism comprising an electromagnet having a plurality of magnetic circuits, an armature member in each of said magnetic circuits, a coil in series with said generator for energizing one of said magnetic circuits and a coil in shunt relation to said generator for energizing another of said magnetic circuits.

5. The combination with an electric generator, and a main circuit therefor, of a unitary mechanism for controlling the voltage of said generator and for controlling said main circuit, said mechanism comprising an electromagnet having a plurality of magnetic circuits, a coil in series with said generator for energizing one of said magnetic circuits and a coil in shunt relation to said generator for energizing a plurality of said magnetic circuits.

6. The combination with an electric generator and a working circuit therefor comprising a battery, of a unitary mechanism for controlling the voltage of said generator and for controlling the working circuit in accordance with the relative values of the voltages of said generator and said battery, said mechanism comprising an electromagnet having a core member of substantially E-shape, armature members coacting with the legs of said core member to form a plurality of magnetic circuits, and coils respectively in shunt and in series relation to said generator for energizing said magnectic circuits.

7. The combination with a variable speed electric generator, and a circuit therefor, of a unitary mechanism for controlling the voltage of said generator and for controlling said circuit, said mechanism comprising an electromagnet having a plurality of parts to constitute a plurality of magnetic circuits, a plurality of movable armature members, a coil for energizing a plurality of said magnetic circuits including said armature members and one of said parts, and a second coil for assisting or opposing the other coil in energizing one of the magnetic circuits comprising another of said parts in accordance with the direction of the current traversing said second coil.

In testimony whereof, I have hereunto subscribed my name this 29th day of March, 1913.

FRANK CONRAD.

Witnesses:
R. E. CULLINGS,
B. B. HINES.